United States Patent [19]

Pillar

[11] 4,032,481

[45] June 28, 1977

[54] HEAT STABILIZERS FOR EXPANDABLE STYRENE POLYMERS

[75] Inventor: Walter O. Pillar, Monroeville, Pa.

[73] Assignee: ARCO Polymers, Inc., Philadelphia, Pa.

[22] Filed: Jan. 30, 1976

[21] Appl. No.: 653,688

[52] U.S. Cl. .................. 260/2.5 FP; 260/2.5 B; 260/2.5 HB; 260/23 H; 260/45.7 R; 260/45.7 P; 260/45.75 W; 260/45.8 A; 260/45.95 J

[51] Int. Cl.² .................................. C08J 9/22

[58] Field of Search ........... 260/2.5 FP, DIG. 24, 260/23 H, 47.7 B, 48.5 A

[56] References Cited

UNITED STATES PATENTS

| | | | |
|---|---|---|---|
| 2,924,532 | 2/1960 | Derlich | 260/DIG. 24 |
| 3,058,928 | 10/1962 | Eichhorn et al. | 260/2.5 FP |
| 3,058,929 | 10/1962 | Vouderhoff et al. | 260/2.5 FP |
| 3,144,422 | 8/1964 | Homberg | 260/23 H |
| 3,275,596 | 9/1966 | Klug et al. | 260/45.95 L |
| 3,313,867 | 4/1967 | Blackburn et al. | 260/45.8 A |
| 3,418,263 | 12/1968 | Hindersinn et al. | 260/45.75 B |
| 3,652,494 | 3/1972 | Baker | 260/45.8 A |

Primary Examiner—Morton Foelak
Attorney, Agent, or Firm—Lewis J. Young

[57] ABSTRACT

Expandable styrene polymer particles having reduced flammability are made by incorporating from 0.1 to 15 weight per cent of organic halogen compounds into the polymer during impregnation of the polymer particles with a blowing agent in aqueous suspension. Temperatures greater than 90° C., during the impregnation step, often cause degradation of the halogen compound and subsequent degradation of the polymer at the particle surface. The addition of certain thermal stabilizers, such as a mixture of a modified epoxidized soybean oil and a barium/cadmium organic complex, stabilizes the halogen compounds in the suspension system to temperatures up to 115° C.

10 Claims, No Drawings

HEAT STABILIZERS FOR EXPANDABLE STYRENE POLYMERS

BACKGROUND OF THE INVENTION

The invention relates to a process for incorporating halogenated compounds into styrene polymer particles in aqueous suspension during the impregnation of the particles with a blowing agent.

Polymer foams are highly desirable in building construction because of their light weight and good heat insulating property. A prerequisite for use in the construction industry is the foam must have reduced flammability. Many halogenated organic compounds have been proposed as additives for the purpose of reducing the flammability of the foams.

In the case of expandable styrene polymer particles, the halogen compounds are often added to the particles by heating an aqueous suspension of styrene polymer particles in the presence of the halogen compound and a blowing agent until the particles are impregnated with the additives. Impregnation with the blowing agent to produce expandable styrene polymer particles may be carried out at temperatures between 60° and 150° C. However, when the organic halogen compounds are added to the impregnation system, lower temperatures, usually 60°–90° C., are used to prevent decomposition of the halogen compound which may in turn cause degradation of the polymer and subsequent impairment of the molding properties of the polymer. These lower temperatures require longer times for the impregnation process and, in the case of larger polymer particles, the particles may not be completely impregnated, as shown by the presence of hard cores in the particles after expansion. Shorter times of impregnation and the elimination of hard cores in the particles can both be accomplished by carrying out the impregnation at higher temperatures. It was, therefore, desirable to have a process for impregnation of styrene polymer particles with blowing agents at higher temperatures while still not detrimentally affecting the organic halogen compounds.

SUMMARY OF THE INVENTION

It has now been found that the impregnation of styrene polymer particles with blowing agents in aqueous suspension in the presence of organic halogen compounds can be accomplished at temperatures of between 100° and 115° C. by adding to the suspension prior to heating a thermal stabilizer system for the halogen compound.

DETAILED DESCRIPTION OF THE INVENTION

In accordance with the invention, a variety of expandable thermoplastic homopolymers and copolymer can be made to have reduced flammability. The polymers may be derived from vinyl aromatic monomers, such as styrene, vinyl toluene, isopropylstyrene, alphamethylstyrene, chlorostyrenes, tert-butylstyrene, etc., as well as copolymers prepared by the copolymerization of at least 50 percent by weight of a vinyl aromatic monomer with monomers such as butadiene, alkyl methacrylates, alkyl acrylates, acrylonitrile and maleic anhydride. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as for example in U.S. Pat. No. 2,983,692, by suspending the particles in water with the aid of suspending agent systems such as tricalcium phosphate in combination with an anionic surfactant.

The blowing agents are compounds which are gases or which will produce gases on heating. Suitable agents include aliphatic hydrocarbons containing from 4–7 carbon atoms in the molecule, such as butane, pentane, cyclopentane, hexane, heptane, cyclohexane, and the halogenated hydrocarbons which boil at a temperature below the softening point of the polymer. Mixtures of these agents may also be used, such as a 20/40/40 mixture of cyclopentane/isopentane/n-pentane, or a 55/45 mixture of trichlorofluoromethane/n-pentane. Usually from 3 to 20 percent of blowing agent per 100 parts of polymer is incorporated by the impregnation.

Conventionally, the impregnations are carried out at temperatures from 60° to 90° C. when the halogen-compounds are utilized, because higher temperatures tend to decompose the halogen-compound causing discoloration of the polymer and actual degradation of the polymer at the particle surface. Unfortunately, the impregnation is slow at these temperatures and the particles are not always impregnated to the core of the particle. This results, on expansion of the particle, in a hard core in the foamed particle. To eliminate this hard core problem, it is desirable to impregnate at temperatures of bwetween 100° and 115° C. The use of these higher temperatures is made possible by the present invention, i.e., the addition during the impregnation process of a thermal stabilizer system for the organic halogen compound.

In the process of the invention, styrene polymer particles are suspended in water with the aid of a difficulty-water-soluble suspending agent, such as tricalcium phosphate and an anionic surfactant extender. To the suspension is added from 0.2 to 15 percent by weight, based on polymer, of the desired halogen-compound, from 3.0 to 20 percent by weight of the blowing agent, and from 0.2 to 4.0 percent by weight of the desired thermal stabilizer system. If used, 0.2 to 2.0 percent by weight of an organic peroxide synergist is also added at this point. The suspension is then heated to a temperature, preferably between 100° and 115° C. for 6 to 15 hours to impregnate the polymer particles and uniformly disperse the halogen-compound throughout the polymer. After the impregnation is complete, the particles are cooled to room temperature, acidified with hydrochloric acid, separated from the aqueous medium, and washed with water. The particles are then dried to produce expandable particles which when molded produce foamed articles having reduced flammability.

Depending upon the end use, foamed articles containing larger amounts of halogen-compound, such as amounts greater than 3.0 parts per 100 parts of polymer, are given reduced flammability without the aid of synergistic amounts of organic peroxides. With lesser amounts of the halogen-compound, it is preferred to use from 0.2 to 2.0 parts per 100 parts of polymer of an organic peroxide to aid in the decomposition of the halogen-compound when burned.

Suitable for the synergistic-action are those organic peroxides which decompose at temperatures above 115° C. This limitation is necessary to prevent premature decomposition of the peroxide during the impregnation step. Useful examples are dicumyl peroxide, 2,5-dimethyl-2,5-di(tert-butylperoxy)hexane, 1,3-bis-(α-tert-butyl-peroxyisopropyl)benzene, di(3-tert-butylperoxy-1,3-dimethylbutyl)carbonate, and 2,5-dimethyl-2,5-di(tert-butylperoxy)-3-hexyne.

Suitable organic halogen compounds are any of the highly halogenated compounds known to impart reduced flammability to styrene polymer particles. Typical examples are the 1,1,2,3,4,4-hexabromo-2-butene of U.S. Pat. No. 3,819,547; the brominated arylidene ketones of U.S. Pat. No. 3,766,136; the brominated cinnamic acid esters of U.S. Pat. No. 3,766,249; and the brominated aryl butanes of U.S. Pat. No. 3,826,766.

The thermal stabilizer system useful in this invention consists essentially of a mixture of five substances all of which are known to be stabilizers for polyvinyl chloride. Although certain of these known stabilizers can be used alone to help reduce the degradation of the organic halogen compounds in styrene polymers, only the instant mixture has been found which controls degradation without any undesired side-effects such as bad odor and/or plasticization resulting in heat sensitivity of moldings made from the expandable styrene polymers.

The elements of the stabilizer mixture consist essentially of barium nonylphenoxide, cadmium 2-ethylhexanoate, tricresyl phosphite, epoxidized soybean oil, and 2,2-bis[p-(1,2-epoxypropoxy)phenyl] propane.

Barium nonylphenoxide may be prepared by the reaction of barium hydroxide with nonylphenol. The nonylphenol may be prepared by alkylation of phenol with nonyl halide in the presence of aluminum chloride catalyst.

Cadium 2-ethylhexanoate may be prepared by the reaction of cadium oxide with 2-ethylhexanoic acid in refluxing methanol.

Tricresyl phosphite may be prepared by the esterification of phosphorous acid with cresol.

Epoxidized soybean oil may be prepared by the reaction of natural soybean oil with hydrogen peroxide.

The 2,2-bis[p-(1,2-epoxypropoxy)phenyl] propane may be prepared by the reaction of 2 moles of epichlorohydrin with one mole of the condensation product of 2 moles of phenol with one mole of acetone.

All of these stabilizers can be prepared as suggested, but all are available, in one form or another, commercially.

The preferred combination of these stabilizers consists essentially of (a) 0.06–1.2% by weight of barium nonylphenoxide, (b) 0.02–0.4% by weight of cadmium 2-ethylhexanoate, (c) 0.02–0.4% by weight of trycresyl phosphite, (d) 0.07–1.40% by weight of epoxidized soybean oil, and (e) 0.03–0.60% by weight of 2,2-bis [p-(1,2-epoxypropoxy) phenyl] propane, wherein all percentages are based on the weight of styrene polymer particles to be stabilized. The total amount of (a), (b), and (c) will preferably equal the total amount of (d) and (e). One way to obtain these proportions is to make up a solution of (a), (b), and (c) together and a solution of (d) and (e) together. Then, equal parts of each solution may be added to the suspension of polymer particles, organic halogen compounds, and blowing agent, and the impregnation step undertaken.

Preferably the total amount of stabilizer mixture added should be between 0.2 and 4.0% by weight based on the weight of styrene polymer particles to be impregnated. Less than 0.2 weight % of the mixture does not prevent degradation of the polymer particles, while greater than 4% does not appear to serve any useful function Generally, the amount of stabilizer mixture required is dependent upon the amount of organic halogen compound used, The invention is further illustrated by the following examples, wherein parts are parts by weight unless otherwise indicated.

EXAMPLE I

To a 12-oz. Crown cap bottle was charged 150 g. of water, 2.0 g. of tricalcium phosphate, 0.05 g. of sodium dodecylbenzene sulfonate, 100 g. of polystyrene beads having bead size of between on 20 and through 10 mesh U.S. Standard Sieve and an intrinsic viscosity of 0.88 at 30° C. in toluene, 0.7 g. of hexabromo-2-butene, 1.15 g. of a mixture of 40 weight percent 1,3-bis(α-tert-butylperoxyisopropyl)benzene adsorbed onto 60 weight percent tricalcium phosphate, 6.6 g. of trichlorofluoromethane, 5.5 g. of n-pentane, and, as heat stabilizer, a mixture of 0.09 g. of barium nonylphenoxide, 0.03 g. of cadmium 2-ethylhexanoate, 0.03 g. of tricresyl phosphite, 0.105 g. of epoxidized soybean oil, and 0.045 g. of 2,2-bis[p-(1,2-epoxypropoxy)phenyl] propane.

The bottle was capped and cycled 3 hours at 90° C. followed by 10 hours at 105° C. in an oil bath polymerizer. The bottles were then cooled to room temperature, opened, acidified with hydrochloric acid, the beads separated from the aqueous medium, washed with water, and air dried. The resulting polystyrene had an intrinsic viscosity of 0.86 and a water content of 0.1%, indicating little or no degradation of the polymer during impregnation.

The beads were pre-expanded by heating for 2 minutes in steam at 5 psig to give prepuff having a bulk density of 0.93 pounds per cubic foot (lb./cu.ft.)

The prepuffed beads were then overcharged to a 5½ inches × 5½ inches × ½ inch mode cavity, dampened with a water spray, pressed between platens heated to 121° C. for 1 minute, and cooled by circulating water in the platens. The resulting foam plaque had the exact dimensions of the mold, and was fused to the extent of 53% with a foam density of 1.4 lb./cu.ft.

A 1 inch × 5 inches × ½ inch specimen cut from the foam plaque was hung lengthwise from a clamp over a microburner having a ¾ inch yellow flame. The flame was positioned ¾ inch from the bottom edge of the foam sample for 3 seconds. The average vertical burn time (time from withdrawal of the flame to flame-out of the foam) for 5 samples was 0.7 seconds. Polystyrene foam not containing the hexabromo-2-butene burned completely in this test.

For comparison, a second bottle was charged indentically to the first charge, except without the heat stabilizer mixture, and was heated in the same manner. The resultant polymer had an intrinsic viscosity of 0.68 and a water content greater than 1%, indicating substantial polymer degradation. On pre-expansion as before, the prepuff had a bulk density of 1.7 lb./cu/ft. and exhibited "pruning" (i.e. a non-spherical shape due to large internal cells). Foam plaques molded as before were fused to 77% but the molding had shrunk away from the mold and exhibited heat sensitivity, i.e., collapse of the foam cells to an unacceptable degree, and had a foam density of 2.1 lb./cu.ft. The average vertical burn time for 5 samples was 1.7 seconds.

EXAMPLE II

To illustrated the effect of total concentration of the stabilizer mixture on the resultant polymer foam the following impregnations were run. A mixture, A, was prepared from 3 parts of barium nonylphenoxide, 1 part of cadmium 2-ethylhexanoate and 1 part of tricresyl phosphate. A second mixture, B, was prepared from 7 parts of epoxidized soybean oil and 3 parts of 2,2-bis [p-(1,2-epoxypropoxy)phenyl] propane.

The impregnation procedure of Example I was repeated only substituting the amounts of mixture A and B shown in Table I for the heat stabilizer mixture of Example I. The resultant polymer beads were pre-expanded as in Example I and the cell size measured and reported as external cell size in mils/internal cell size in mils. Those samples listed as pruned were unsatisfactory due to excessive degradation of the polymer. Prepuff densities are preferably less than 1 pound per cubic foot (p.c.f.).

TABLE I

| Stabilizer % A/% B | Prepuff Density p.c.f. | Cell Size Ext./Int., mils |
|---|---|---|
| None | 1.20 | Pruned |
| 0.01/0.01 | 1.20 | Pruned |
| 0.05/0.05 | 1.11 | Pruned |
| 0.15/0.15 | 0.92 | 2/3 |
| 0.25/0.25 | 0.93 | 2/4 |
| 0.50/0.50 | 0.86 | 2/3 |
| 0.75/0.75 | 0.86 | 1/3 |
| 1.0/1.0 | 1.01 | 1/3 |

EXAMPLE III

To illustrate the effect of various stabilizer mixtures on the prepuff cell size and density, various mixtures were used at the 0.30 weight percent level in the procedure of Example I. The results are listed in Table II. Stabilizer mixture C was prepared from 0.09 g. of barium nonylphenoxide, 0.03 g. of cadmium 2-ethylhexanoate, 0.03 g. of tricresyl phosphite, 0.105 g. of epoxidized soybeam oil, and 0.045 g. of 2,2-bis[p-(1,2-epoxypropoxy) phenyl] propane. Mixture D was prepared from 0.09 g. of barium nonylphenoxide, 0.03 g. of cadmium 2-ethylhexanoate, 0.03 g. of tricresyl phosphite, and 0.15 g. of epoxidized soybean oil. Mixture E was prepared from 0.10 g. of barium nonylphenoxide, 0.10 g. of cadmium 2-ethylhexanoate, and 0.10 g. of tricresyl phosphite. Mixture F was prepared from 0.21 g. of epoxidized soybean oil and 0.09 g. of 2,2-bis[p-(1,2-epoxypropoxy)phenyl] propane. Mixture G was prepared from 0.30 g. of epoxidized soybean oil.

TABLE II

| Stabilizer Mixture | Prepuff Density p.c.f. | Cell Size Ext./Int. mils | Comment |
|---|---|---|---|
| None | 1.20 | Pruned | Polymer degraded |
| C | 0.92 | 2/3 | Good molding |
| D | 1.02 | 1/3 | Moldings heat sensitive |
| E | 1.02 | 1/7 | Large cells, heat sensitive |
| F | 0.88 | 1/6 | Large cells |
| G | 0.91 | Pruned | Heat sensitive |

Thus, only mixture C, the stabilizer system of the present invention gave good density moldings having good foam cell size and no sensitivity of the foam to heat.

Similar tests substituting the polystyrene beads with beads of styrene-maleic anhydride (8.0% anhydride) copolymer beads, styrene acrylonitrile (30.0% nitrile) copolymer beads, or styrene-methyl acid maleate (12.0% maleate) copolymer beads, also indicated that best results were obtained with stabilizer mixture C.

I claim:

1. In a process for making styrene polymer particles less flammable by impregnating the polymer particles by heating in aqueous suspension in the presence of an organic halogen compound known to impart reduced flammability to styrene polymer particles and a blowing agent at temperatures greater that 100° C., the improvement comprising adding, prior to impregnation, about 0.2 to 4.0 percent by weight of a thermal stabilizer system for the organic halogen compound; said stabilizer system consisting essentially of a mixture of:
   a. 0.06–1.2 percent by weight of barium nonylphenoxide;
   b. 0.02–0.4 percent by weight of cadmium 2-ethylhexanoate;
   c. 0.02–0.4 percent by weight of tricresyl phosphite;
   d. 0.07–1.40 percent by weight of epoxidized soybean oil; and
   e. 0.03–0.60 percent by weight of 2,2-bis [p-(1,2-epoxypropoxy phenyl] propane, wherein the sum of (a), (b) and (c) is equal to the sum of (d) and (e), and all percents are based on the weight of styrene polymer particles; whereby the polymer molecular weight is not degraded during the impregnation process.

2. The process of claim 1 wherein the styrene polymer particles are polystyrene.

3. The process of claim 1 wherein the styrene polymer particles are a copolymer of styrene with less than 50% by weight of maleic anhydride.

4. The process of claim 1 wherein the styrene polymer particles are a copolymer of styrene with less than 50% by weight of acrylonitrile.

5. The process of claim 1 wherein the styrene polymer particles are a copolymer of styrene with less than 50% by weight of methyl acid maleate.

6. A styrene polymer composition consisting essentially of styrene polymer particles impregnated with 0.2 to 15.0 weight percent of an organic halogen compound known to impart reduced flammability to styrene polymer particles, 3 to 20 weight percent of an organic blowing agent, and 0.2 to 4.0 weight percent of a thermal stabilizer system for the organic halogen compound; said stabilizer system consisting essentially of a mixture of:
   a. 0.06–1.20% by weight of barium nonylphenoxide;
   b. 0.02–0.4% by weight of cadmium 2-ethylhexanoate;
   c. 0.02–0.4% by weight of tricresyl phosphite;
   d. 0.07–1.40% by weight of epoxidized soybean oil; and
   e. 0.03–0.60% by weight of 2,2-bis[p-(1,2-epoxypropoxy)phenyl]propane;

wherein the sum of (a), (b) and (c) is equal to the sum of (d) and (e), and all percents are based on the weight of styrene polymer particles.

7. The composition of claim 6 wherein the styrene polymer particles are polystyrene.

8. The composition of claim 6 wherein the styrene polymer particles are a copolymer of styrene with less than 50% by weight of maleic anhydride.

9. The composition of claim 6 wherin the styrene polymer particles are a copolymer of styrene with less than 50% by weight of acrylonitrile.

10. The composition of claim 6 wherein the styrene polymer particles are a copolymer of styrene with less than 50% by weight of methyl acid maleate.

* * * * *